United States Patent [19]

Wilfert et al.

[11] 3,889,968

[45] June 17, 1975

[54] MOTOR VEHICLE, ESPECIALLY PASSENGER MOTOR VEHICLE

[75] Inventors: Karl Wilfert, Gerlingen-Waldstadt; Béla Barényi, Maichingen, both of Germany

[73] Assignee: Daimler-Benz Aktiengesellschaft, Germany

[22] Filed: Mar. 4, 1974

[21] Appl. No.: 447,816

[30] Foreign Application Priority Data
Mar. 3, 1973   Germany............................ 2310710

[52] U.S. Cl.............................. 280/111; 296/28 K
[51] Int. Cl............................................. B62d 31/00
[58] Field of Search............ 280/111, 112 R, 112 A; 296/28 E, 28 K

[56] References Cited
UNITED STATES PATENTS

| 2,696,387 | 12/1954 | Nordin | 280/112 A |
| 2,700,570 | 1/1955 | Barenyi | 296/28 |
| 2,820,646 | 1/1958 | Kolbe | 280/112 A |
| 3,237,961 | 3/1966 | McMullen | 280/112 R |

FOREIGN PATENTS OR APPLICATIONS

| 887,306 | 8/1953 | Germany | 296/28 K |
| 891,505 | 9/1953 | Germany | 296/28 K |

Primary Examiner—Philip Goodman
Assistant Examiner—John A. Carroll
Attorney, Agent, or Firm—Craig & Antonelli

[57] ABSTRACT

A vehicle, especially a passenger motor vehicle which includes two axle aggregates offset in the vehicle longitudinal direction with respect to one another and associated with the front section and the rear section of the vehicle, as well as at least one vehicle body incorporating the passenger space which is pivotally supported in the vehicle transverse direction; the vehicle body is thereby connected with respect to at least one of the axle aggregates by way of at least one crank whose pivot pin coordinated to the axle aggregate is located higher than the pivot pin coordinated to the vehicle body, the crank being provided within the area of the upper boundary of the vehicle body; additionally, pivotally connected coupling rods are provided for the connection between the vehicle body and the axle aggregate which are disposed within the area of the lower boundary of the vehicle body and extend generally in the vehicle longitudinal direction.

65 Claims, 14 Drawing Figures

MOTOR VEHICLE, ESPECIALLY PASSENGER MOTOR VEHICLE

The present invention relates to a vehicle, especially a passenger motor vehicle with two axle aggregates mutually offset in the vehicle longitudinal direction and belonging to the front section and rear section of the vehicle, as well as with at least one vehicle body enclosing the passenger space which is pivotally supported in the vehicle transverse direction.

With a known vehicle of this type, the pivotal support of the vehicle body takes place by way of trapezoidally shaped quadrilateral joint systems whose upper joinst have a smaller distance with respect to each other than the lower joints and whose upper and lower joints belonging respectively to the same vehicle side are connected by way of guide members which are movable only transversely to the vehicle longitudinal axis and of which two each are provided at the height of the front axle and of the rear axle. Such a construction can be realized only with difficulty in conjunction with modern motor vehicle suspensions because the joints, if the loads for the joints and for the guide members are not to become unfavorable and therefore require strong and heavy dimensions, have to be located essentially in the vehicle cross planes containing the center axes of the wheels and because furthermore the suspensions formed by the guide members include lower joints which are located relatively low. Notwithstanding these measures, the absorption of forces acting in the vehicle longitudinal direction offers difficulties in the prior art.

The present invention is now concerned with the task to so conceive a vehicle of the aforementioned type that the aforementioned disadvantages are avoided and that notwithstanding good cross-movability, also a good absorption of forces acting in the vehicle longitudinal direction results.

This is attainable according to the present invention with a vehicle of the aforementioned type in that the vehicle body is connected with respect to at least one of the axle aggregates by way of at least one crank, whose pivot pin coordinated to the axle aggregate is disposed higher than the pivot pin coordinated to the vehicle body and which is provided within the area of the upper boundary of the vehicle body, as well as by way of at least one pivotally connected coupling rod disposed within the area of the lower boundary of the vehicle body and extending in the vehicle longitudinal direction. The solution according to the present invention makes it possible to achieve the aimed-at pivotability of the vehicle body by way of relatively light-weight and small structural elements which may be arranged essentially offset in the longitudinal direction with respect to the wheel center axis of the respective axle aggregate without danger to the rigidity of the vehicle, because the occurring bending forces can be kept small by way of the provided coupling rod. This is true in particular if the crank and coupling rod are arranged one above the other at a distance which is as large as possible. The effect of transverse vibrations on the vehicle body can be considerably reduced by the transverse movability of the vehicle body attainable by the present invention.

Within the scope of the solution according to the present invention in which according to a further feature, the center of gravity of the vehicle body is located preferably at the height of the roll-axis of the vehicle body or below the same, the vehicle body may be connected with one or with both axle aggregates by way of one crank each. If a connection is provided by way of the crank with only one of the axle aggregates, then transverse accelerations which occur especially when driving through curves—assuming a location of the center of gravity below the roll-axis—have as a result, in addition to the aimed-at effect of an inclination or tilting into the curve, an offset or displacement of the axes with respect to one another and correspondingly steering effects, as are aimed at under certain circumstances for curve drives, by reason of the lateral pivotal deflection of the vehicle body and of the axle aggregate non-pivotally connected therewith with respect to the axle aggregate pivotally connected with the vehicle body.

The connection of the vehicle body with only one of the axle aggregates by way of a crank may therebeyond have as a consequence that with corresponding countersupport within the area of the other axle aggregate, for example, by way of the support springs, the effect of the tilting or inclination into the curve, to be referred to hereinafter as curve-tilting or curve-inclination effect, is far-reachingly neutralized. Consequently, a vehicle can be provided by these means which in relation to the tilting into the curve behaves neutrally also with a relatively soft construction of the support spring system and whose driving characteristics and properties in the curve are improved additionally by the attained steering effect.

Whereas with solutions within the scope of the present invention, in which the vehicle body is supported by way of a crank with respect to only one of the axle aggregates, a stabilization of the vehicle body is attainable by the conventional support with respect to the other axle aggregate, which precludes at least essentially an undesirable tilting-off of the vehicle body, for example, when boarding and when leaving, other measures prove as particularly appropriate especially in connection with constructions, in which the vehicle body is supported with respect to both axle aggregates by one crank each, by means of which a stabilization of the vehicle body is attainable in such cases. Measures suitable therefor consist in the installation of damping elements, of abutments, or also of blocking devices which release the pivotabilities existing as such due to the presence of the cranks, for example, only with a rolling vehicle.

A further embodiment within the scope of the present invention resides in that the vehicle body is connected with respect to at least one of the axle aggregates by way of two cranks which are arranged symmetrically to the vertical vehicle longitudinal center plane. The cranks within the scope of the present invention may be disposed parallel to each other or may be disposed at an angle to each other. With a parallel position of the cranks, exclusively a transverse offset results, whereas with an angular position additionally a curve inclination effect results. With such a support of the vehicle body with respect to one or also with respect to both axle aggregates, the stabilization of the vehicle body necessary for the ingress and egress, or for the loading of the vehicle is achieved essentially already beforehand, even though additional abutments, damping means or blocking devices of the aforementioned type may be provided. It is possible within the scope of the present invention to exercise an influence by the magnitude of the angular position of the cranks with respect to each other, on whether in a given case primarily transverse vibrations (parallel position of the cranks) are to be dampened or also whether a curve-inclination effect (angular position of the cranks) is to be achieved. In order to have to accept the fewest possible compromises in that regard and in order to be able to undertake an adaptation to the respectively given conditions, it is also within the purview of the present invention to make the angular position of the cranks with respect to one another adjustable by conventional means.

In a further embodiment of the present invention, the vehicle body may also be supported with respect to one of the axle aggregates by way of one crank and with respect to the other axle aggregate by way of two cranks. Such a solution is appropriate particularly with respect to the stabilization of the vehicle body during ingress and egress and during loading and unloading.

It is appropriate for the support of the vehicle body with respect to the axle aggregates pivotally connected by way of cranks, if two coupling rods each, which are arranged symmetrically to the vehicle longitudinal center plane, are provided in the connection of the vehicle body with an axle aggregate. These coupling rods may be disposed according to the present invention parallel to one another or may also be positioned at an angle to one another. During the pivoting deflection of the crank, i.e., during offset of the vehicle body with respect to the axle aggregate, streses occur, theoretically considered, by reason of the occurring change in position of the pivot pins of the cranks and of the points of pivotal connection of the coupling rods, which stresses would preclude a relative movability between the vehicle body and the respective axle aggregate. The occurring offsets are, however, relatively small so that the wedging or jamming to be theoretically feared, does not occur in practice. However, in order to avoid also stresses eventually conditioned by the offsets, it may be appropriate within the scope of the present invention to provide elastic bearing supports for the pivot pins of the cranks and/or for the points of pivotal connection of the coupling rods. Bearing supports are thereby appropriate for the cranks in which the provided bearings are elastically supported by conventional means.

In order to assure a favorable stressing of the coupling rods especially under those load conditions, under which the largest loads and stresses will result, as for example, for the braking with a front axle aggregate pivotally supported with respect to the vehicle body, it may be of advantage to so locate the point of pivotal connection on the vehicle body side of the respective coupling rod that it is located in front of the point of pivotal connection on the axle aggregate side.

Furthermore, it may be of advantage within the scope of the solution according to the present invention if the coupling rods are constructed as deformation elements so that in case of extreme loads, as may occur already with relatively minor accidents, the danger of damages to the vehicle body is reduced.

Such a construction is in particular of advantage if within the scope of the solution according to the present invention, the vehicle is of cellular type construction and the axle aggregates belonging to the front section and the rear section of the vehicle are component parts of the cells forming the front section and the rear section. With such a construction, the vehicle body disposed between the front cell and the rear cell forms the vehicle passenger cell as independent element. In particular, such a type of construction proves advantageous within the scope of the solution according to the present invention, especially as the pivotability according to the present invention can be realized with such a construction also without constructive difficulties. A drive aggregate and/or auxiliary aggregates may be coordinated to an axle aggregate or to a cell including an axle aggregate within the scope of the present invention.

Accordingly, it is an object of the present invention to provide a vehicle, especially a passenger motor vehicle which avoids by simple means the aforementioned shortcomings and drawbacks encountered in the prior art.

Another object of the present invention resides in a motor vehicle which permits a pivotal support of the vehicle body with respect to a vehicle end section that can be realized without difficulties in conjunction with modern wheel suspension.

A further object of the present invention resides in a vehicle of the type described above, in which the various parts of the pivotal connection are of relatively simple and light-weight construction without jeopardizing the ability to absorb forces acting in the vehicle longitudinal direction.

Still another object of the present invention resides in a motor vehicle, especially a passenger motor vehicle in which good cross-movability is combined with good absorption of forces acting in the longitudinal direction of the vehicle.

A further object of the present invention resides in a motor vehicle of the type described above in which the desired pivotability of the vehicle body can be realized by structural elements that are relatively small and light-weight without endangering the rigidity of the vehicle.

These and further objects, features and advantages of the present invention will become more apparent from the following description when taken in connection with the accompanying drawing which shows, for purposes of illustration only, several embodiments in accordance with the present invention, and wherein.

Figure 3:
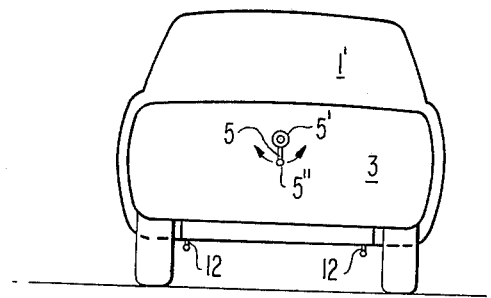
FIG. 3 is a schematic rear elevational view of the vehicle according to FIG. 2 in the rest or normal position of the vehicle.
Figure 5:
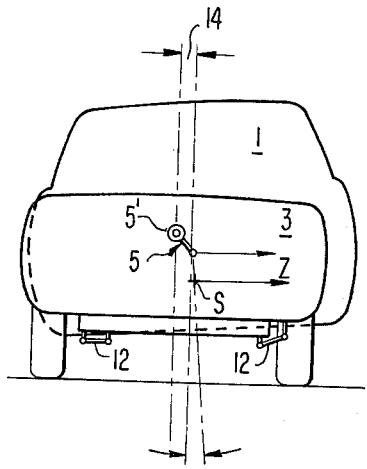
FIG. 5 is a schematic rear elevational view of the vehicle according to FIG. 2 with a twisting and lateral offset of the cellular sections under the influence of centrifugal forces occurring in a left curve.
Figure 6:
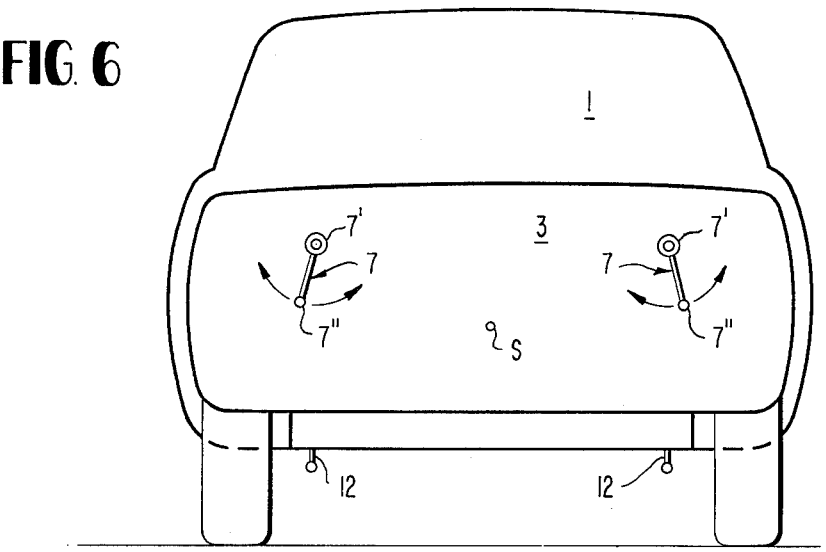
Figure 7:
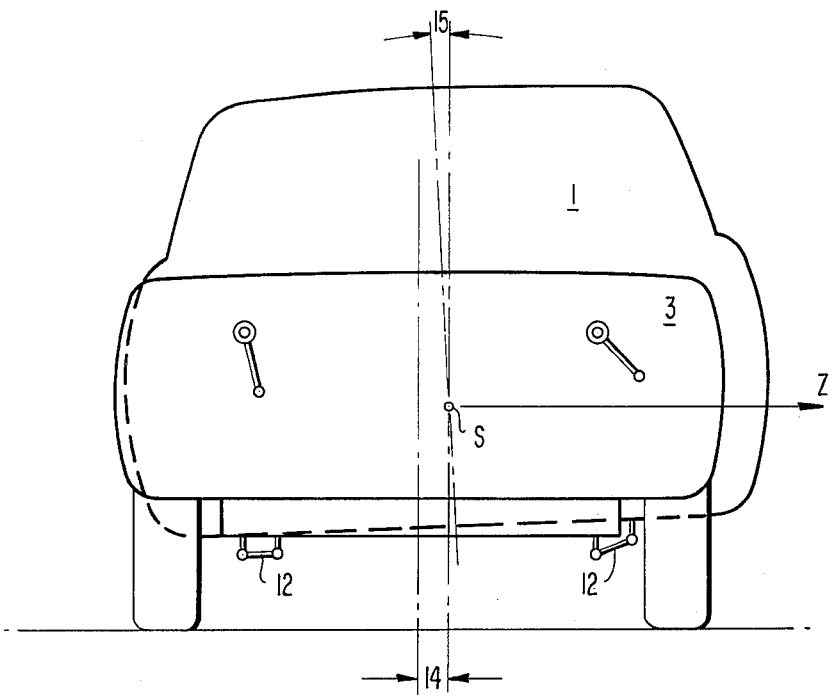

FIG. 6 is a schematic rear elevational view, corresponding to FIG. 3, of a modified embodiment of a motor vehich which is again of cellular type of construction and in which the cells are connected with each other by way of two cranks disposed symmetrically to the vertical vehicle longitudinal center plane; and FIG. 7 is a schematic rear elevational view of the vehicle according to FIG. 6, in a driving condition corresponding to FIG. 5.

Referring now to the drawing, wherein like reference numerals are used throughout the various views to designate like parts, and more particularly to FIGS. 1a to 1h which illustrate in schematic plan view vehicles built of cellular type of construction, reference numeral 1 designates in each of these figures the passenger cell forming the vehicle body, reference numeral 2 the front cell forming the front section and reference numeral 3 the rear cell forming the rear section thereof. The front cell 2 and the rear cell 3 include each an axle aggregate of conventional construction (not shown) and possibly also a drive unit of conventional construction and/or auxiliary aggregates of conventional type. Various pivotabilities are illustrated in FIGS. 1a–1h, and more particularly a pivotability between unitary vehicle body and front section with respect to the rear section, between unitary vehicle body and rear section with respect to the front section, and between vehicle body with respect to each of front and rear section.

Figure 1A:
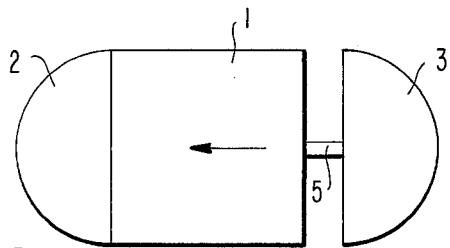
FIGS. 1a–1h are schematic plan views of various embodiments of vehicles of cellular type of construction representing different pivotabilities between the passenger cell as vehicle body, either alone or together with an end cell, on the one hand, and the cell or cells forming the front section and/or rear section, on the other, achieved by way of cranks in accordance with the present invention.
Figure 1D:
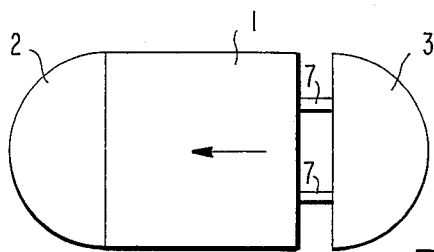
Figure 1B:
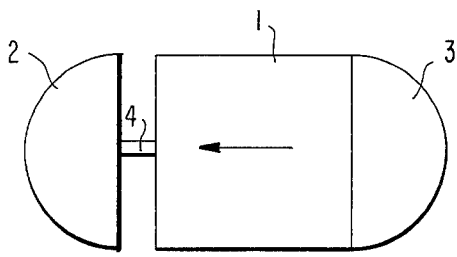
Figure 1E:
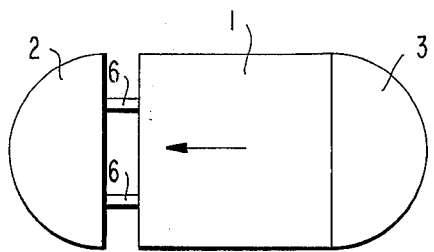
Figure 1C:
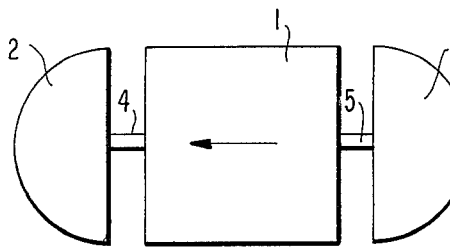

FIGS. 1a–1c now illustrate embodiments in which the passenger cell 1 is connected with the front cell 2 and/or the rear cell 3 by way of one crank 4 or 5 each, which is disposed in the vertical vehicle longitudinal center plane and whose arrangement is additionally so made that it is located near the upper boundary of the passenger cell 1 as vehicle body within the area of the transition to the front cell 2 or to the rear cell 3. Further details of the crank arrangement and especially also the arrangement of the coupling rods offset according to the present invention in the vertical direction with respect to the cranks between respectively adjacent cells, connected by way of cranks, will be explained more fully hereinafter by reference to FIG. 2.

Of these FIGS. 1a–1c, FIG. 1a illustrates a solution within the scope of the present invention, in which a pivotability created by the crank 5 is provided only between the passenger cell 1 and the rear cell 3 whereas such a pivotability is absent between the front cell 2 and the passenger cell 1 and possibly a rigid connection of any conventional type exists therebetween. FIG. 1b illustrates a reversal of the solution according to FIG. 1a, and in this case the passenger cell 1 is connected with the front cell 2 by way of a crank 4 whereas a pivotability between the passenger cell 1 and the rear cell 3 is lacking or absent. The solution according to FIG. 1c illustrates a construction in which the passenger cell 1 is pivotally connected with the front cell 2 and the rear cell 3 by way of one crank 4 and 5 each, respectively.

Figure 2:
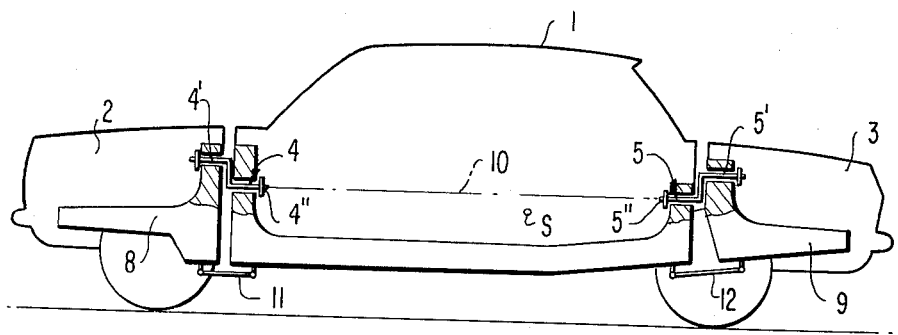
FIG. 2 is a schematic side elevational view, partially in cross section through a vehicle of cellular type of construction, in which the vehicle passenger cell is connected with the front cell and the rear cell by way of one crank each and by way of coupling rods offset downwardly in the vertical direction with respect to the cranks.

Since with an arrangement of only one crank 4 or 5 each between vehicle passenger cell 1 and front cell 2 or rear cell 3, the passenger cell 1 reacts in a sensitive manner to weight displacements and is able to deflect as a result of rotation about its roll-axis, and since the coupling rods illustrated in FIG. 2 permit a relatively wide freedom for such types of movements, an additional limitation of the freedom of movement as is attainable, for example, by elastic or rigid abutments or the like is appropriate in such case.

Figure 1F:
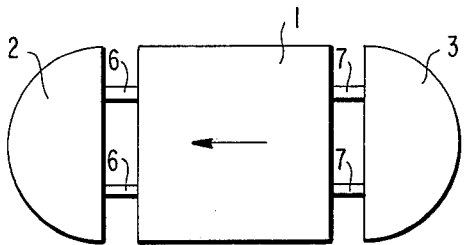

FIGS. 1d to 1f illustrate embodiments in which, differing from the embodiment according to FIGS. 1a to 1c but with otherwise similar constructions, two cranks 6 and 7 each are provided, and more particularly in an arrangement symmetrical to the vertical vehicle longitudinal center plane. The cranks 6 and 7 may thereby, as illustrated in detail in FIGS. 6 and 7, be disposed at an angle to one another, and more particularly in such a manner that the axes of the straight lines containing the pivot pins thereof intersect in a point disposed above the center of gravity of the cell 1 in the vertical vehicle longitudinal center plane. With the use of two cranks 6 and 7 each, the sensitivity with respect to undesired reactions in case of weight displacements in the passenger cell 1 is small.

Figure 1G:
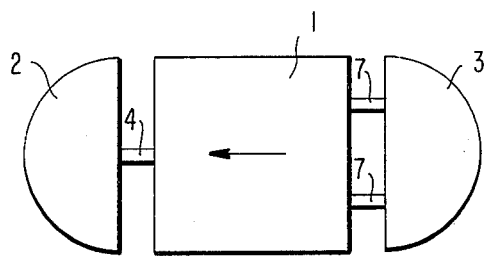
Figure 1H:
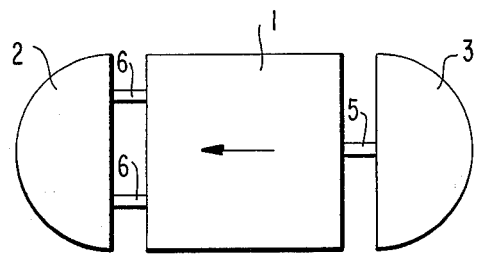

In the additional embodiments contained in FIG. 1, namely, in the embodiments according to FIGS. 1g and FIG. 1h, solutions are illustrated in which, according to the present invention, only one crank 4 or 5 is provided between one of the end cells, namely the front cell 2 or the rear cell 3 and the passenger cell 1 and two cranks 7 or 6 are provided between the passenger cell 1 and the other end cell, namely, the rear cell 3 or the front cell 2.

FIG. 2 now illustrates in detail how the arrangement of the cranks between the vehicle passenger cell 1 forming in this case the vehicle body and the cells 2 and 3 forming the front section and the rear section takes place. The cranks 4 and 5, of which one each is provided between the passenger cell 1 and the front cell 2 or the rear cell 3 in the embodiments according to FIGS. 3 to 5 corresponding to the illustration according to FIG. 1c, are provided respectively within the area of the upper boundary of the passenger cell 1 forming the vehicle body within the transition to the end cells formed by the front cell 2 and the rear cell 3, whereby of the cranks 4 and 5, the respective upper pivot pin 4' and 5' is coordinated to the front cell 2 and the rear cell 3, respectively. The coordination to the front cell 2 and to the rear cell 3 corresponds to the coordination to the front axle aggregate 8 and to the rear axle aggregate 9, which in the cellular type of construction selected in the embodiment forms a component of the respective cell. The respectively lower pivot pins designated by reference numeral 4'' and 5'' of the cranks 4 and 5 are coordinated to the passenger cell 1 so that the roll axis 10 of the passenger cell 1 is determined by the lower pivot pins 4'' and 5''. It is appropriate for the cranks 4 and 5, if the pivot pins thereof are not only rotatably guided, for example, in ball bearings, roller bearings or slide bearings, but if at least one of their pivot pins, preferably the pivot pin coordinated to the vehicle body, is also elastically supported, which is attainable, for example, by an elastic bush receiving the respective bearing. In view of the fact that, as illustrated in FIG. 5, the passenger cell 1 is to tilt or incline toward the inner side of the curve when driving through a curve (curve-tilting or curve-inclination), the center of gravity S of the passenger cell 1 is located below the roll axis 10. The closer the center of gravity S is moved toward the roll axis 10, the smaller becomes the curve-tilting or curve-inclination effect. If the center of gravity S is located at the height of the roll axis 10 which represents a boundary case within the scope of the solution according to the present invention, then no rotation or pivoting about the roll axis 10 results any longer for the passenger cell 1, when driving through a curve, but only a transverse displacement of the passenger cell 1 with respect to the end cell 2, 3, as also with other locations of the center of gravity.

Whereas the cranks 4 and 5 are to be as high as possible and therewith near the upper boundary of the vehicle body within the area of the transition thereof to the end cells 2, 3, the coupling rods 11, 12 provided additionally in the transition between the cells 1 and 2 and between the cells 1 and 3 are arranged as low as possible. In the illustrated embodiment, the coupling rods 11 and 12 extend along the bottom side of the vehicle whereby in their normal position, as can be seen from FIG. 3, they are disposed parallel to the vehicle longitudinal direction and are pivotally connected at the cells 1, 2 and 1, 3 connected thereby. In the illustrated embodiment according to FIGS. 2 to 5, two coupling rods 11 and 12 each are provided in the transition between the cells 1, 2 and 1, 3, and more particularly at the largest possible distance to one another and symmetrically to the vertical vehicle longitudinal center plane.

As can be seen from FIG. 4, the pivotal connection between the passenger cell 1 and the end cells 2 and 3, described by reference to FIGS. 2 and 3, has as a consequence, when driving over one-sided obstacles that the end cells 2 and 3 including the axle aggregates 8 and 9 are twisted with respect to the passenger cell 1 by an angular amount which corresponds to that angle which is subtended by the straight lines containing the points of contact of the wheel with respect to the ground. The mentioned angles are designated in FIG. 4 by reference numeral 13. During the twisting of the end cells, of which only the end cell 3 is visible in the rear view according to FIG. 4, with respect to the passenger cell 1, the coupling rods 12 connecting these cells are brought into a corresponding inclinded position. A change in distance results therefrom as such between the cells, in this case the cells 1 and 3, which would have as a consequence a blocking action with an assumed guidance free of play or clearance in the points of pivotal connection of the coupling rods 12 and in the crank bearing supports. However, such a blocking does not occur within the scope of the practical construction and within the scope of the relatively small offsets or displacements which occur in practice. Additionally, such a block action can also be counteracted by the provision of corresponding elasticities or displaceabilities, for example, also by a limited longitudinal displaceability of the crank pins in their bearings.

Whereas, in the embodiment according to FIG. 4, the passenger cell 1 retains its position and the rear cell 3 exclusively is pivoted about the crank pin 5' coordinated thereto as pivot axis with respect to the passenger cell 1, in the case described by reference to FIG. 5, a transverse offset or displacement of the passenger cell 1 with respect to the rear cell 3 and additionally a twisting of the passenger cell 1 with respect to the rear cell 3 takes place whereby the rear cell 3 retains its position relative to the ground as reference plane. More particularly, FIG. 5 illustrates—in rear view—a possible instantaneous picture of the vehicle when driving through a left curve, whereby a centrifugal force Z directed toward the outside of the curve engages in a known manner in the center of gravity S. This centrifugal force Z has as a consequence a transverse offset or displacement 14 of the passenger cell 1 with respect to the rear cell 3 or, as not illustrated herein in detail, also with respect to the front cell 2 since the latter is connected in the same manner with the passenger cell 1. In addition to the transverse offset 14 which results from the pivoting of the crank about its pivot pin 5' coordinated to the rear cell 3, also a twisting of the passenger cell 1 with respect to the rear cell 3—and in a similar manner also again with respect to the front cell 2—takes place because the center of gravity S is located in the illustrated embodiment below the roll axis 10 which under the influence of the centrifugal force Z has as a consequence a torque effecting the described twisting of the passenger cell. The torque occurring under the influence of the centrifugal force Z brings about the rotation of the passenger cell 1 about the pivot pin 5'' associated therewith or about the pivot pin 4'' in relation to the front cell 2.

Both the twisting of the passenger cell 1 with respect to the end cells 2 and 3 as also the transverse offset or displacement may be limited within the scope of the present invention by abutments. The latter may be formed by conventional elastic cushions or buffers which become harder or stiffer with increasing travel or also by rigid abutments, not illustrated in detail herein since they may be of any conventional construction. They may also act on the respective coupling rods 11 and 12 or may also be constituted by abutment parts which are provided at one of the cells and cooperate with corresponding counter-pieces at the respectively adjacent cell. Furthermore, also the transverse offset and/or the twisting may be limited in that the pivot pins 5' and/or 5'' are rotatable only within limits which is attainable, for example, in that the pivot pins are retained by way of rubber bushes which are torsional only within given limits.

Figure 4:
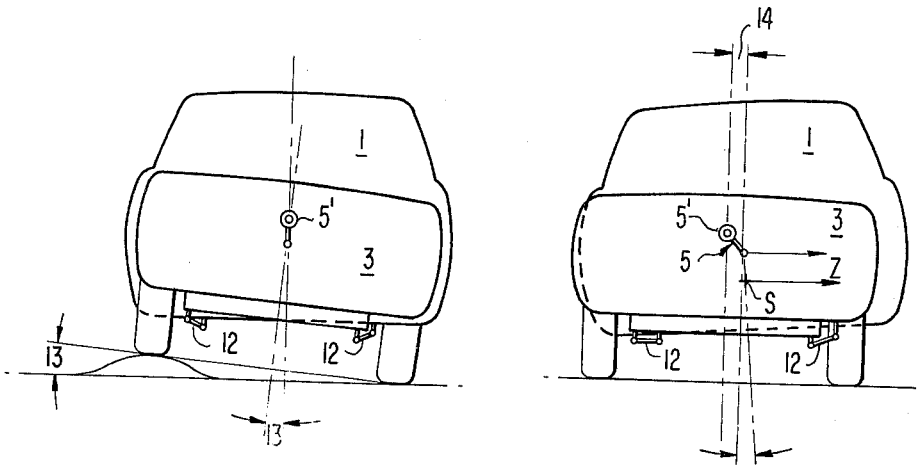
FIG. 4 is a schematic rear elevational view of the vehicle according to FIG. 2 with a twisting of adjacent cell sections caused by a ground unevenness.

Whereas an illustration corresponding to the schematic view according to FIG. 1c is shown in FIGS. 3 to 5, a solution corresponding in its overall construction to the schematic view according to FIG. 1f is illustrated in FIGS. 6 and 7. The solution of FIGS. 6 and 7 differs from the solution described by reference to FIGS. 3 to 5 in that now not one, but two cranks 7 are provided between adjacent cells, i.e., for example, between the passenger cell 1 and the rear cell 3, and more particularly in an arrangement symmetrical with respect to the vertical vehicle longitudinal center plane and with an angular position with respect to each other. The cranks 7 are thereby so positioned that the straight lines containing the pivot pins 7' and 7'' intersect above the center of gravity S. The point of intersection of the aforementioned straight lines which in the rest or normal position of the vehicle coincides with the vertical vehicle longitudinal center plane, determines the respective roll axis. Also with this arrangement, in which—analogous to the illustration according to FIGS. 2 to 5—coupling rods are provided between the adjacent cells, of which those visible and provided between the rear cell 3 and the passenger cell 1 are again designated by reference numerals 12, centrifugal forces Z engaging in the center of gravity S of the passenger cell 1 effect a transverse offset or displacement of the passenger cell 1 with respect to the end cells, of which only the rear cell 3 is visible in this case. In addition to the transverse offset again designated by reference numeral 14, a twisting of the passenger cell 1 with respect to the end cells results again also with this construction, which end cells are designated in FIGS. 6 and 7 by reference numerals 2 and 3 analogous to the reference numerals chosen for FIG. 1f. The twisting—the twist angle is designated in FIG. 7 by reference numeral 15—occurs, as explained by reference to FIG. 5, because the center of gravity is located below the roll axis (not shown). This location of the center of gravity also has as a consequence that the twisting takes place in the sense of an inclination of the passenger cell 1 into the curve.

Also, in embodiments according to FIGS. 6 and 7 as well as in the remaining arrangements, not described herein a detail according to FIGS. 1a to 1h, limiting means of any conventional type may again be provided, by means of which the transverse offset and the twisting can be limited to predetermined maximum values. Limiting means suitable for that purpose were disclosed and explained in connection with FIG. 5.

If no cellular type of construction, properly speaking, as can be seen in particular from FIG. 2, is used within the scope of the solution according to the present invention, but instead of a solution is sought in which the outer covering body panels of the vehicle body including the passenger space overlap the vehicle front section and rear section, then an arrangement may be provided underneath this panel covering as has been described according to FIGS. 1a to 1h. Only the axle aggregates and the drive units coordinated thereto are then pivotally connected in such a case with the vehicle body by way of cranks whereas the parts of the vehicle body extending over or overlapping the axle aggregates are not so connected. The construction in principle may correspond with such a construction as regards the pivotal connection of the cranks to that which is illustrated in FIG. 2 and explained in part with reference thereto.

While we have shown and described several embodiments in accordance with the present invention, it is understood that the same is not limited thereto, but is susceptible of numerous changes and modifications as known to those skilled in the art; for example, the coupling rods may be constructed as deformation members of any known conventional type, and we therefore do not wish to be limited to the details shown and described herein but intend to cover all such changes and modifications as are encompassed by the scope of the appended claims.

What we claim is:

1. A vehicle comprising:
   front axle aggregate means belonging to a front vehicle section,
   rear axle aggregate means belonging to a rear vehicle section, said rear axle aggregate means being spaced from the front axle aggregate means in the vehicle longitudinal direction,
   vehicle body means including a passenger space,
   at least one crank means pivotally connecting the vehicle body means to one of said axle aggregate means; said crank means including a first pivot pin means coordinated to said one axle aggregate means and a second pivot pin means coordinated to the vehicle body means, said first and second pivot pin means being at respective different vertical heights and extending substantially in the vehicle longitudinal direction,
   and at least one coupling rod means which is pivotally connected at said vehicle body means and at said one of said axle aggregate means, said coupling rod means extending in the vehicle longitudinal direction and being pivotally connected at the vehicle body means and said one of said axle aggregate means at respective pivot points disposed below the respective first and second pivot pin means.

2. A vehicle according to claim 1, characterized in that the pivot pin means coordinated to said one axle aggregate means is located higher than the pivot pin means coordinated to the vehicle body means.

3. A vehicle according to claim 2, wherein said vehicle body means has a roll axis, and characterized in that the center of gravity of the vehicle body means is located at most substantially at the height of the vehicle body roll axis in such a manner that the vehicle body means assumes an inclination toward the inside of the curve when driving through a curve.

4. A vehicle according to claim 3, characterized in that the center of gravity of the vehicle body means is located below the vehicle body roll axis.

5. A vehicle according to claim 3, characterized in that the vehicle body means is operatively connected with both axle aggregate means by way of one of said crank means each.

6. A vehicle according to claim 3, characterized in that the vehicle body means is operatively connected with at least one of the two axle aggregate means by way of two of said crank means.

7. A vehicle according to claim 6, characterized in that the two crank means are arranged substantially symmetrically to the vertical vehicle longitudinal center plane.

8. A vehicle according to claim 7, characterized in that the crank means are disposed at an angle to one another.

9. A vehicle according to claim 8, characterized in that the vehicle body means is operatively connected with one of said axle aggregate means by way of one of said crank means and with the other of said axle aggregate means by way of two of said crank means.

10. A vehicle according to claim 8, characterized in that the vehicle body means is operatively connected with both axle aggregate means by way of two of said crank means.

11. A vehicle according to claim 3, characterized in that the connection of the vehicle body with an axle aggregate means includes two of said coupling rod means.

12. A vehicle according to claim 11, characterized in that the two coupling rod means are arranged substantially symmetrically to the vertical vehicle longitudinal center plane.

13. A vehicle according to claim 12, characterized in that two of said crank means are arranged substantially symmetrically to the vertical vehicle longitudinal center plane.

14. A vehicle according to claim 13, characterized in that with a connection of one of said axle aggregate means with the vehicle body means by way of two of said crank means, the coupling rod means are disposed essentially vertically underneath the crank means.

15. A vehicle according to claim 14, characterized in that the coupling rod means are disposed parallel to one another.

16. A vehicle according to claim 14, characterized in that the coupling rod means are angularly inclined to one another.

17. A vehicle according to claim 14, characterized in that the coupling rod means are constructed as deformation elements.

18. A vehicle according to claim 14, characterized in that damping means effective in the vehicle transverse direction are provided between at least one of the axle aggregate means and the vehicle body means pivotally guided with respect thereto by said crank means and coupling rod means.

19. A vehicle according to claim 18, characterized by limit means for limiting the transverse offset of the vehicle body means with respect to the axle aggregate means pivotally connected with the same.

20. A vehicle according to claim 19, characterized by limit means for limiting the maximum angle of rotation of the vehicle body means about the roll axis.

21. A vehicle according to claim 20, characterized in that yieldable means are provided for limiting at least one of the transverse offset and angle of rotation of the vehicle body means.

22. A vehicle according to claim 21, characterized in that yieldable means are provided for limiting both the transverse offset and the angle of rotation of the vehicle body means.

23. A vehicle according to claim 22, characterized in that at least one abutment means is provided for limiting one of the transverse offset and the angle of rotation.

24. A vehicle according to claim 23, characterized in that at least one abutment means each is provided for limiting the transverse offset and the angle of rotation, respectively.

25. A vehicle according to claim 14, characterized in that with a cellular construction for the vehicle, the front and rear axle aggregate means are components of respective cells forming the front section and rear section of the vehicle and in that a passenger cell is located between the front and rear cells and forms at least part of the vehicle body means.

26. A vehicle according to claim 25, characterized in that at least one of drive aggregate and auxiliary aggregate is operatively connected with an axle aggregate means.

27. A vehicle according to claim 26, characterized in that a drive aggregate and an axle aggregate is connected with an axle aggregate means.

28. A vehicle according to claim 25, characterized in that at least one of drive unit and auxiliary unit is operatively connected with a cell belonging to an axle aggregate means.

29. A vehicle according to claim 28, characterized in that a drive unit and auxiliary units are operatively connected with a cell belonging to an axle aggregate means.

30. A vehicle according to claim 26, characterized in that the coupling rod means are disposed parallel to one another.

31. A vehicle according to claim 26, characterized in that the coupling rod means are angularly inclined to one another.

32. A vehicle according to claim 26, characterized in that the coupling rod means are constructed as deformation elements.

33. A vehicle according to claim 26, characterized in that damping means effective in the vehicle transverse direction are provided between at least one of said axle aggregate means and the vehicle body means pivotally guided with respect thereto.

34. A vehicle according to claim 26, characterized by limit means for limiting the transverse offset of the vehicle body means with respect to the axle aggregate means pivotally connected with the same.

35. A vehicle according to claim 26, characterized by limit means for limiting the maximum angle of rotation of the vehicle body means about the roll axis.

36. A vehicle according to claim 26, characterized in that yieldable means are provided for limiting at least one of the transverse offset and angle of rotation of the vehicle body means.

37. A vehicle according to claim 36, characterized in that yieldable means are provided for limiting both the transverse offset and the angle of rotation of the vehicle body means.

38. A vehicle according to claim 26, characterized in that at least one abutment means is provided for limiting one of the transverse offset and the angle of rotation.

39. A vehicle according to claim 38, characterized in that at least one abutment means each is provided for limiting the transverse offset and the angle of rotation, respectively.

40. A vehicle according to claim 1, characterized in that with a cellular construction for the vehicle, the front and rear axle aggregate means are components of respective cells forming the front section and rear section of the vehicle and in that a passenger cell is located between the front and rear cells and forms at least part of the vehicle body means.

41. A vehicle according to claim 40, characterized in that at least one of drive aggregate and auxiliary aggregate is operatively connected with an axle aggregate means.

42. A vehicle according to claim 41, characterized in that a drive aggregate and an axle aggregate is connected with an axle aggregate means.

43. A vehicle according to claim 40, characterized in that at least one of drive unit and auxiliary unit is operatively connected with a cell belonging to an axle aggregate means.

44. A vehicle according to claim 43, characterized in that a drive unit and auxiliary units are operatively connected with a cell belonging to an axle aggregate means.

45. A vehicle according to claim 1, wherein said vehicle body means has a roll axis, and characterized in that the center of gravity of the vehicle body means is located at most substantially at the height of the vehicle body roll axis in such a manner that the vehicle body means assumes an inclination toward the inside of the curve when driving through a curve.

46. A vehicle according to claim 45, characterized in that the center of gravity of the vehicle body means is located below the vehicle body roll axis.

47. A vehicle according to claim 1, characterized in that the vehicle body means is operatively connected with both axle aggregate means by way of one crank means each.

48. A vehicle according to claim 1 characterized in that the vehicle body means is operatively connected with at least one of the two axle aggregate means by way of two of said crank means.

49. A vehicle according to claim 1, characterized in that two of said crank means are arranged substantially symmetrically to the vertical vehicle longitudinal center plane.

50. A vehicle according to claim 49, characterized in that the crank means are disposed at an angle to one another.

51. A vehicle according to claim 49, characterized in that the vehicle body means is operatively connected with one of said axle aggregate means by way of one of said crank means and with the other of said axle aggregate means by way of said crank means.

52. A vehicle according to claim 48, characterized in that the vehicle body means is operatively connected with both of said axle aggregate means by way of two of said crank means.

53. A vehicle according to claim 1 characterized in that the connection of the vehicle body means with an axle aggregate means includes two of said coupling rod means.

54. A vehicle according to claim 53, characterized in that the two coupling rod means are arranged substantially symmetrically to the vertical vehicle longitudinal center plane.

55. A vehicle according to claim 53, characterized in that with a connection of one of said axle aggregate means with the vehicle body means by way of two of said crank means, the coupling rod means are disposed essentially vertically underneath the crank means.

56. A vehicle according to claim 53, characterized in that the coupling rod means are disposed parallel to one another.

57. A vehicle according to claim 53, characterized in that the coupling rod means are angularly inclined to one another.

58. A vehicle according to claim 53, characterized in that the coupling rod means are constructed as deformation elements.

59. A vehicle according to claim 1 characterized in that damping means effective in the vehicle transverse direction are provided between at least one of said axle aggregate means and the vehicle body means pivotally guided with respect thereto.

60. A vehicle according to claim 1, characterized by limit means for limiting the transverse offset of the vehicle body means with respect to the axle aggregate means pivotally connected with the same.

61. A vehicle according to claim 1, characterized by limit means for limiting the maximum angle of rotation of the vehicle body means about roll axis of the vehicle body means.

62. A vehicle according to claim 1, characterized in that yieldable means are provided for limiting at least one of the transverse offset and angle of rotation of the vehicle body means.

63. A vehicle according to claim 62, characterized in that elastically yieldable means are provided for limiting both the transverse offset and angle of rotation of the vehicle body means.

64. A vehicle according to claim 1, characterized in that at least one abutment means is provided for limiting one of the transverse offset and the angle of rotation.

65. A vehicle according to claim 64, characterized in that at least one abutment means each is provided for limiting the transverse offset and the angle of rotation, respectively.

* * * * *